(12) United States Patent
Choi et al.

(10) Patent No.: US 8,491,562 B2
(45) Date of Patent: Jul. 23, 2013

(54) MULTILAYER FILM FOR FUNCTIONAL MEDICAL SOLUTION CONTAINER AND A CONTAINER COMPRISING THE SAME

(75) Inventors: Sang-Ho Choi, Seoul (KR); Sung-Man Lee, Yongin-si (KR); Jin-Sung Moon, Pyeongtaek-si (KR)

(73) Assignee: Choongwae Corporation (KR)

( * ) Notice: Subject to any disclaimer, the term of this patent is extended or adjusted under 35 U.S.C. 154(b) by 205 days.

(21) Appl. No.: 12/810,225

(22) PCT Filed: Dec. 19, 2008

(86) PCT No.: PCT/KR2008/007540
§ 371 (c)(1),
(2), (4) Date: Jun. 23, 2010

(87) PCT Pub. No.: WO2009/082132
PCT Pub. Date: Jul. 2, 2009

(65) Prior Publication Data
US 2010/0280485 A1    Nov. 4, 2010

(30) Foreign Application Priority Data
Dec. 24, 2007  (KR) ........................ 10-2007-0136007

(51) Int. Cl.
*A61B 19/00*    (2006.01)
*B32B 23/08*    (2006.01)
*B32B 7/02*    (2006.01)
*B32B 1/08*    (2006.01)

(52) U.S. Cl.
USPC ........... 604/410; 604/408; 604/416; 428/515; 428/516; 428/517; 428/212; 428/213; 428/35.2

(58) Field of Classification Search
USPC .................. 604/408, 410, 416; 428/515, 516, 428/517, 212, 213, 35.2
See application file for complete search history.

(56) References Cited

U.S. PATENT DOCUMENTS 4,772,497 A * 9/1988 Maasola ...................... 428/35.2
5,616,420 A   4/1997 Yamaoka et al.
(Continued)

FOREIGN PATENT DOCUMENTS
CN   1444521    9/2003
JP   06-286087    10/1994
(Continued)

OTHER PUBLICATIONS

Franke, Rolf, and Otto Bergmann. "Background information on Infusion Therapy." Braun. N.p., Aug. 21, 2001. Web. Feb. 29, 2012. <http://www.bbraun.com/documents/Knowledge/Script_Infusion_Therapy_complete.pdf>.*

(Continued)

*Primary Examiner* — Jacqueline Stephens
*Assistant Examiner* — Andrew J Mensh
(74) *Attorney, Agent, or Firm* — Cantor Colburn LLP

(57) ABSTRACT

The present invention relates to a multilayer film for medical solution container and a container comprising the same, more particularly, to the multilayer film for medical solution comprising an outer layer comprising polypropylene, polypropylene copolymer or a mixture thereof; an intermediate layer comprising a mixture of 30~70% by weight of propylene-based polymer including polypropylene, polypropylene copolymer or a mixture thereof, and 30~70% by weight of a thermoplastic elastomer; and an inner layer comprising a mixture of 50~70% by weight of propylene-based polymer including polypropylene, polypropylene copolymer or a mixture thereof, 5~20% by weight of polyethylene, and 10~45% by weight of a thermoplastic elastomer. The multilayer film has such improved flexibility, transparency, heat resistance, sealing property and durability, as well as easy peelability and peel strength with non-temperature sensitive that can be applied to a pouch type container for packaging and administering of medical solutions or blood.

13 Claims, 4 Drawing Sheets

U.S. PATENT DOCUMENTS

| | | | |
|---|---|---|---|
| 6,007,529 | A | 12/1999 | Gustafsson et al. |
| 6,017,598 | A | 1/2000 | Kreischer et al. |
| 6,127,043 | A | 10/2000 | Lange |
| 6,398,771 | B1 * | 6/2002 | Gustafsson et al. .......... 604/410 |
| 2003/0099792 | A1 | 5/2003 | Andersson et al. |
| 2003/0124370 | A1 | 7/2003 | Suzuki et al. |
| 2004/0078023 | A1 * | 4/2004 | Gollier et al. ................. 604/410 |

FOREIGN PATENT DOCUMENTS

| | | | |
|---|---|---|---|
| JP | 07-276586 | | 10/1995 |
| JP | 09-262948 | | 10/1997 |
| JP | 09262948 | | 10/1997 |
| JP | 11/290422 | * | 10/1999 |
| JP | 2000504956 | | 4/2000 |
| JP | 2001-226499 | | 8/2001 |
| JP | 2002-011839 | | 1/2002 |
| JP | 2002011839 | | 1/2002 |
| KR | 10-0275989 | | 2/1995 |
| KR | 10-0318797 | | 4/1995 |
| KR | 10-0439410 | | 11/2000 |
| KR | 10-0344924 | | 2/2002 |
| KR | 10-0422761 | | 6/2003 |
| KR | 1020030046120 | | 6/2003 |
| KR | 10-2004-0086373 | | 10/2004 |
| WO | WO2006/010410 | * | 2/2006 |

OTHER PUBLICATIONS

Costello, I, C Powell, et al. "Sodium glycerophosphate in the treatment of neonatal hypophosphataemia." Archives of Disease in Childhood. 73. (1995): F44-F45. Web. Feb. 29, 2012. <http://www.ncbi.nlm.nih.gov/pmc/articles/PMC2528378/pdf/archdischfn00064-0048.pdf>.*

Groh-Wargo, Sharon. "Neonatal Parenteral Nutrition." Metrohealth. Metro Health Medical Center, Apr. 7, 2006. Web. Feb. 29, 2012. <http://www.metrohealth.org/documents/patient services/neonatology/Nutrition—TPN (Basics).pdf>.*

"Melt Temps." Plastic Troubleshooter. Texas Plastic Technologies, Nov. 9, 2005. Web. Feb. 28, 2012. <http://www.plastictroubleshooter.com/ThePlasticTroubleshooter/melt_temps.htm>.*

"PP Random Co-polymers." IB Chemistry. Sep. 30, 2002. Web. Feb. 28, 2012. <http://ibchem.com/IB/ibnotes/full/ope_htm/co-polymers.htm>.*

Schachter, CS, and MR Lopez. "Hypomagnesemia." Epilepsy Professionals. N.p., Apr. 2004. Web. Feb. 29, 2012. <http://professionals.epilepsy.com/page/electroab_hypomagnes.html>.*

"Clinical Nutrition." Braun. Braun, Jan. 10, 2006. Web. Feb. 28, 2012. <http://www.bbraun.com/documents/Knowledge/Short_Guide_Clinical_Nutrition.pdf>.*

International Search Report—PCT/KR2008/007540 dated Jul. 29, 2009.

Written Opinion—PCT/KR2008/007540 dated Jul. 29, 2009.

Japanese Office Action—Japanese Application No. 2010-539304 issued on Feb. 28, 2012, citing JP2000-504956, JP2002-11839, JP09-262948, and JP2004-231199.

Chinese Office Action—Chinese Application No. 200880122600 issued on Apr. 6, 2012, citing CN1444521.

Korean Office Action—Korean Application No. 10-2008-0129909 issued on Aug. 23, 2010.

Australian Office Action—Australian Application No. 2008341350 issued on Apr. 7, 2011, citing US20030124370, US20030099792, and US6017598.

* cited by examiner

10

100

MULTILAYER FILM FOR FUNCTIONAL MEDICAL SOLUTION CONTAINER AND A CONTAINER COMPRISING THE SAME

TECHNICAL FIELD

The present invention relates to a multilayer film for medical solution container and a container comprising the same having improved flexibility, transparency, heat resistance, sealing property, durability, easy peelability, peel strength with non-temperature sensitive, so that may be applied to a pouch type container of medical solutions or blood.

BACKGROUND ART

Generally, a medical solution container must meet a number of performance criteria, including flexibility, transparency, gas barrier property, drug compatibility, heat sterilization resistance, fall impact resistance, etc.

It is common used a flexible plastic bag with multiple chambers (two and more) divided by partition walls as the medical solution container. The medical solution container uses partition walls for various medical solutions kept in each chambers not to react with other medical solution kept in other chambers. And when the medical solution is in need to inject to a patient, the medical solution is mixed by pushing the multiple chambers for various medicals solution to be mixed. The mixed functional medical solutions are administered to a patent via spike port using a syringe with sanitary and safe.

In case of administering medical solutions by connecting a few or many medical solution bags or bottles, medical staff may mistake in injecting medical solution, but using the afore-mentioned medical solution having chambers divided by partition walls reduces the mistake by medical staff and gives various merits in keeping and handling Various types of medical solution container are now available, for example, a double bag with an inner bag and outer bag, where the inner bag contains functional medical solutions and the outer bag covers the inner bag and blocks gas as like oxygen.

In this way, medical solution container having multiple chambers or single inner bag wrapped by outer bag have been studied from 10 years ago in Europe, and recently investigation for building up properties, i.e. fall impact resistance as well as gas or moisture barrier function are accelerated.

In general, the inner bag needs to have various properties such as oxygen and moisture barrier property, heat sterilization resistance, transparency, fall impact resistance, flexibility, etc.

Many patents, for example, Korean patent registration No. 10-0275989, Korean patent laid-open 2004-0086373, U.S. Pat. Nos. 6,017,598, 6,007,529, Japanese patent laid-open 1994-286087, and 2001-226499 disclose a medical solution container, which comprises a single layer type or multi layer type having α-olefin or styrene copolymer as an inner bag material. Due to its high constitution ratio of polyolefin, however, the inner bag material has weakness in sterilization at 121° C. and exhibits extreme variation of heat seal strength to temperature, that may make it difficult to maintain good quality, i.e. uniform strength, in easy peelable property.

The medical solution container needs to have good properties such as gas barrier property, fall impact strength, and, transparency, etc. Moreover, since the container is easily dropped, the inner bag must have sufficient properties, i.e. fall impact strength, flexibility, etc. In order to check impurities in functional medical solutions, the film with high transparency is preferably necessary. In addition to this, film for medical solution container guarantee transparency after sterilization of 121° C.

The container stores various functional medical solutions in separate chambers, and when the medical solutions in need to inject to a patient, the medical solutions are mixed by pushing the chambers for partition walls to be opened. Therefore, it is very important partition walls to have proper property. Concretely, the partition walls must keep various medical solutions tightly in state of sealing during keeping, transporting, handling, etc, but need to be open easily by pressure, for example pushing by hands, to mix various medical solutions. For the purpose of these, candidate materials for the container should have proper peel strength with non temperature sensitive on various parameters such as temperature, time and pressure in case of heat seal.

Such peelable heat seal makes adhesion strength increase depending on time or after heat sterilization, so that the partition walls of the container may not peel easily. In regard this, suitable materials, processing method and conditions must be settled. For example, the conditions of peelable heat seal of partition wall may be carried out at lower temperature and pressure, in short time, in comparison with the conditions of peelable heat seal of outer layer.

The present invention has improved easy peelability through adding styrene thermoplastic elastomer into an inner layer of multilayer film container; also the present invention has improved easy peelability with non temperature sensitive and safe quality after sterilization by adding the thermoplastic elastomer and polyethylene.

DISCLOSURE

Technical Problem

To solve the mentioned problems, one object of the present invention is to provide a multilayer film for a medical solution container having improved flexibility, transparency, heat resistance, sealing property, durability, as well as easy peelable property.

Another object of the present invention is to provide a medical solution container with a pouch type for packaging and administering of medical solutions or blood.

Technical Solution

To accomplish this goal, the present invention provides a multilayer film for a medical solution container comprising:

an outer layer comprising polypropylene, polypropylene copolymer or a mixture thereof;

an intermediate layer comprising a mixture of 30~70% by weight of propylene-based polymer including polypropylene, polypropylene copolymer or a mixture thereof, and 30~70% by weight of thermoplastic elastomer; and an inner layer comprising a mixture of 50~70% by weight of propylene-based polymer including polypropylene, polypropylene copolymer or a mixture thereof, 5~20% by weight of polyethylene, and 10~45% by weight of thermoplastic elastomer.

Also, the present invention provides
a medical solution container employing an inner bag with multiple chambers containing medical solutions; and
an outer bag covering the inner bag,
wherein the inner bag comprises the multilayer film.

Advantageous Effect

The multilayer film of the present invention has improved flexibility, transparency, heat resistance, sealing property, durability, as well as easy peelability and peel strength with non-temperature sensitive.

Such multilayer film may be applied to a pouch type container for packaging and administering of medical solutions or blood. Also, the container having the multilayer film of the present invention can be applied to variety of medical industry owing to its excellent competitive price.

BEST MODE

The present invention now will be described more fully hereinafter with reference to the accompanying drawings, in which some, but not all embodiments of the invention are shown.

It is to be understood, however, that the invention is not limited to the specific features shown and described, since the means herein disclosed comprise preferred forms of putting the invention into effect. Like numbers refer to like elements throughout. Moreover, when a layer is on other layer, it may be contact therewith or added another layer between them. For example, it may be added a certain layer including an adhesive layer, a barrier layer for moisture or gas, etc. into a multilayer film.

Figure 1:
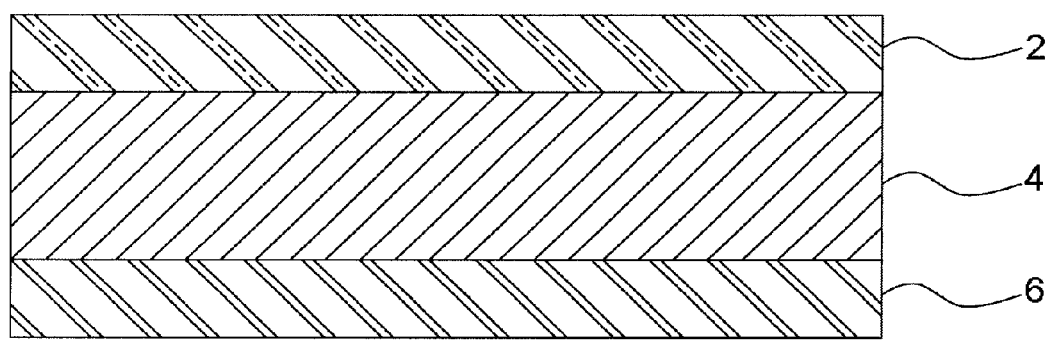
FIG. 1 is a cross-sectional view of the multilayer film in accordance with one embodiment of the present invention.

Referring to FIG. 1, a multilayer film (10) of the present invention comprises an outer layer (2), an intermediate layer (4) and an inner layer (6).

The outer layer protects an overall film and has heat-resistance during heat-sealing, thus this layer is preferable to have proper heat resistance to protect other layers. Also, the outer layer has adequate flexibility, printability, processibility, chemical stability and transparency for printing a recipe, a dose, etc. on its surface.

Suitable material of this outer layer (2) includes polypropylene, polypropylene copolymer, or a mixture thereof, and polypropylene is more preferable.

As used herein, the term 'polypropylene' refers to any propylene-based polymer including isotactic, syndiotactic or atactic structure, especially homopolymer. In a preferred embodiment of the present invention, the polypropylene has a melt flow index (based on ASTM D1238) of 7~9 g/10 min, a density of 0.85~0.95, and softening point of 145~165° C.

As used herein, the term 'polypropylene copolymer' refers to any propylene-based copolymer co-polymerized by propylene and co-monomer with certain ratio. Suitable polypropylene copolymer includes propylene-ethylene copolymer co-polymerized propylene monomer as a major constituent with ethylene monomer as a co-monomer; and propylene-ethylene-α-olefin copolymer co-polymerized propylene monomer as a major constituent with ethylene monomer and at least one α-olefin monomer as co-monomers.

The α-olefin, but are not limited to, may be selected C3~12 hydrocarbon such as 1-butene, 1-pentene, 1-hexene, 4-methyl-1-pentene, 1-heptene, 1-octene, 1-nonene, 1-decene, 1-undecene, 1-dodecene and a mixture thereof.

This polypropylene copolymer may be random copolymer, block copolymer, or graft copolymer, which can be adequately selected depending on application uses by the skilled-person in this art. Moreover, preferable property of polypropylene is same or similar to that of the afore-mentioned polypropylene.

An intermediate layer (4) is designed to have good flexibility for enhancement of impact resistance. The intermediate layer comprises a thermoplastic elastomer and propylene-based polymer selected from the group consisting of polypropylene, propylene copolymer and a mixture thereof.

The polypropylene and polypropylene copolymer used in outer layer (12) may be preferably applicable to the intermediate layer (4). The preferable propylene copolymer may be a random copolymer, and more preferable propylene copolymer may have a melt flow index (based on ASTM D1238) of 6.5~8.5 g/10, a density of 0.85~0.95, a melting point of 120~140° C. and a softening point of 105~125° C.

Preferable thermoplastic elastomer may be selected from the group consisting of SBS (styrene-butylene-styrene copolymer), SEBS (styrene-ethylene-butylene-styrene copolymer), SIS (styrene-isoprene-styrene copolymer), SBC (styrene-butadiene block copolymer) and a mixture thereof, but are not limited to. SEBS (styrene-ethylene-butylene-styrene copolymer) is more preferable.

In a preferred embodiment of the present invention, the thermoplastic elastomer having a density of 0.85~0.95, melt flow index (based on ASTM D1238) of 1~3 g/10 min and 100% modulus of 0.5~0.7 is used.

Considering acts or functions as the intermediate layer (4), the amount of the propylene-based polymer and thermoplastic elastomer may be controlled preferably. It is preferable that the weight ratio of the propylene-based polymer and thermoplastic elastomer is 30~70:30~70. When the weight ratio of polypropylene exceeds, flexibility of the intermediate layer decreases. Otherwise, when the weight ratio of thermoplastic elastomer exceeds, it is difficult to guarantee the heat resistance of the intermediate layer.

The inner layer (6) of the present invention contacts with medical solutions (for example, I.V solution) directly and thus is preferably designed to have good drug stability, heat seal property, and flexibility as well as high transparency. Especially, it is characterized that the inner layer (6) has easy peelable property. Therefore, the inner layer is preferably designed to have proper peel strength with non temperature-sensitive when an unexpected change of temperature.

In a preferred embodiment of the present invention, the inner layer (6) comprises propylene-based polymer selected from the group consisting of polypropylene, polypropylene copolymer, and a mixture thereof; polyethylene; and thermoplastic elastomer. Therefore, blocking problem induced by inner layer adhesion after sterilization is prevented.

More detail of materials such as polypropylene, polypropylene copolymer, and thermoplastic elastomer used in the inner layer (6) is followed by the afore-mentioned explanation.

Random copolymer of polypropylene copolymer is preferable, and more preferable polypropylene copolymer has of a melt flow index (based on ASTM D1238) of 6.0~8.0 g/10 min, a density of 0.85~0.95, a melting point of 135~155° C. and a softening point of 120~140° C.

Also, preferable thermoplastic elastomer of the present invention has a density of 0.80~0.90, melt flow index (based on ASTM D1238) of 9~11 g/10 min and 100% modulus of 1.0~1.2.

As used herein, the term "polyethylene" refers to any conventional polyethylene such as low density polyethylene (LDPE), linear low density polyethylene (LLDPE), high density polyethylene (HDPE), very low density polyethylene (VLDPE) etc, but is not limited to. Especially high density polyethylene (HDPE) is more preferable. In a preferred embodiment of the present invention, the polyethylene has 0.2~0.4 g/10 min of melt flow index (based on ASTM D1238), 0.9~1.0 of density, 125~145° C. of melting point, and 115~135° C. of softening point.

The inner layer (6) comprises a mixture of 50~70% by weight of propylene-based polymer including polypropylene, polypropylene copolymer or a mixture thereof, 5~20% by weight of polyethylene and 10~45% by weight of thermoplastic elastomer. If the preferable weight ratio of polypropylene copolymer, polyethylene and elastomer exceeds the afore-mentioned ratio, the inner layer (6) can not meet the purpose of the present invention.

Polyethylene in the inner layer gives anti-blocking property to the inner layer (6), so if the quantity of polyethylene is under the preferable weight ratio, the inner layer (6) has insufficient anti-blocking property, and if the quantity of polyethylene exceeds the preferable weight ratio, mechanical property of the inner layer (6) extremely deteriorate.

Additive also may be added to each or all of layers of multilayer film (10) comprising the outer layer (2)/intermediate layer (4)/inner layer (6), if necessary. The additive may be conventional additives, but are not limited to, for example, anti-oxidants, anti-adhesion agents, processing agents, pigments, antistatic agents, etc. The minimum quantity of additive is preferable to prevent the additives from merging into the medical solution during heat sterilization.

The thickness of each layer of the multilayer film is preferably controlled to have proper property as a medical solution container. Preferable thickness ratio of each layer is outer layer:intermediate layer:inner=10~20%:60~80%:10~20%. More specifically, preferable thickness of the outer layer, intermediate layer, and inner layer is 10~60 μm, 140~240 μm and 10~60 μm, respectively. If the thickness of each layer is under the above-mentioned range, the property of each layer does not meet necessary criterion needed in a medical solution container. For example, if the thickness of the outer layer is under the above-mentioned range, heat resistance deteriorates. Contrarily, if the thickness of outer layer exceeds the above-mentioned range, the flexibility and heat seal property of the overall film deteriorate. Also, if the thickness of the inner layer (6) goes beyond the above-mentioned range, easy peelability of the multilayer film deteriorates.

In addition, it is preferable to perform heat seal of the multilayer film (10) of the present invention at lower temperature than melting points of each material to obtain easy peelability, i.e. peelable heat seal.

Namely, since the melting point of the outer layer (2), intermediate layer (4) and inner layer (4) is 150~165° C., 130~145° C., and 130~150° C. respectively, the heat seal process is executed at a temperature ranging from about 121 to 140° C. When the sealing temperature is under 121° C., it may peel by steam sterilization executed at 121° C. for 30 min. Accordingly, it is preferable to control the sealing temperature and time, as well as selecting suitable materials for each layer.

In accordance with the present invention, the multilayer film for the medical solution container is preferably fabricated by conventional method as known in this art.

For example, the multilayer can be made by co-extrusion method or lamination method.

The co-extrusion process is executed as following: melting more than two resin materials at different extruders, injecting the melted resins into a die, stacking as layers, and cooling the layers using various methods. The co-extrusion method gives the advantage of fabricating uniform thickness of extrusion material with efficiency. Also, it is so low the quality deterioration of resin material during extrusion that each layer shows proper properties and the obtained multilayer has high transparency and flexibility. There are two co-extrusion processes: one is inflation method using circular die, and the other is T-die method using flat die. The inflation method is preferred in view point of clearness, and T-die method is better in view point of uniform thickness of each layer.

In a preferred embodiment of the present invention, the multilayer film is fabricated at the temperature of 170~250° C., more preferably at the temperature of 200~230° C. by the co-extrusion process. It is preferable that melt flow rate (MFR) difference between resins for each layer is little to give uniform thickness of each layer and good extrusion performance.

In a preferred embodiment of the present invention, the multilayer film has proper properties, for example, haze, heat adhesion property, tensile strength, elongation, etc. Therefore it can be used for a container of medical solutions. In some preferred embodiment of the present invention, the multilayer film has a haze after sterilization of 25% and less (based on ASTM D 1003), a tensile strength (based on ASTM 882) of 250 kgf/cm$^2$ and more, and an elongation (based on ASTM 882) of 900% and more.

The multilayer film of the present invention can be used as an inner bag of double bag medical solution container.

The container for medical solutions has multiple chambers, and the medical solutions are kept in each chambers divided by partition walls, and the partition walls are opened by pushing the chamber in use. In the concrete, the container of the present invention has easy peelability under proper pressure. Therefore the container stores various functional medical solutions which interact easily during long-term storage in separate chambers as premix form, and when the medical solutions in need to inject to a patient, the medical solutions are mixed by pushing the chambers for partition walls to be opened.

In one embodiment of the present invention, the container comprises an inner bag with multiple chambers containing medical solutions; and an outer bag covering the inner bag. Preferably, the inner bag comprises the multilayer film as above-mentioned.

In particular, the partition walls dividing chambers break up easily, because the inner bag has proper easy peelability by having adequate heat adhesion intensity or sealing intensity.

Namely, when the heat seal strength is high, the partition walls of the inner bag cannot be open by forcing intended pressure, so that the medical solutions cannot be mixed. Otherwise, when the heat-sealing strength is low, the partition walls of the inner bag can be open easily, so that the medical solutions can be mixed during storage or transportation steps.

Specially, high temperature treatment is necessary at molding process during fabrication of the container or sterilizing treatment before use of the container, etc. At these high temperature treatments of medical solution container, easy peelable property of the inner bag must be kept, and rapid change of heat adhesion intensity regarding temperature change of the inner bag must be minimized. It is possible that the container of the present invention keeps easy peelable property notwithstanding high temperature treatments, because the multiple layer of the present invention has restricted range of melting temperature, and restricted range of heat adhesion intensity (peeling intensity) regarding temperature change owing to specific constituent of the materials of inner layer.

Meanwhile, the conventional materials may be preferably used as a material of the outer bag. For example, the outer bag can be used any material having good properties including moisture and gas barrier property, processibility, transparency, mechanical plasticity, impact resistance and chemical stability, but are not limited to.

In a preferred embodiment of the present invention, the container may have 2-chamber bag, 3-chamber bag, etc according to the number of medical solution embedded in the container, and the container may be designed horizontally, vertically, and diagonally, if desired. The peel strength of the container for vertical division is preferably higher than that for horizontal division. When the content of medical solutions is quite a few in terms with inner volume, the container should have high peel strength. In addition, it is preferable that the peel strength of container wrapped not following easy peelable line is higher that the peel strength of container wrapped following easy peelable line. For example, ideal peel strength necessary for easy opening to adult and not opening during transportation is 5~15N/15 mm, and an adequate film having proper peel strength is necessary satisfying preferable peel strength according to each bag design.

Figure 2:
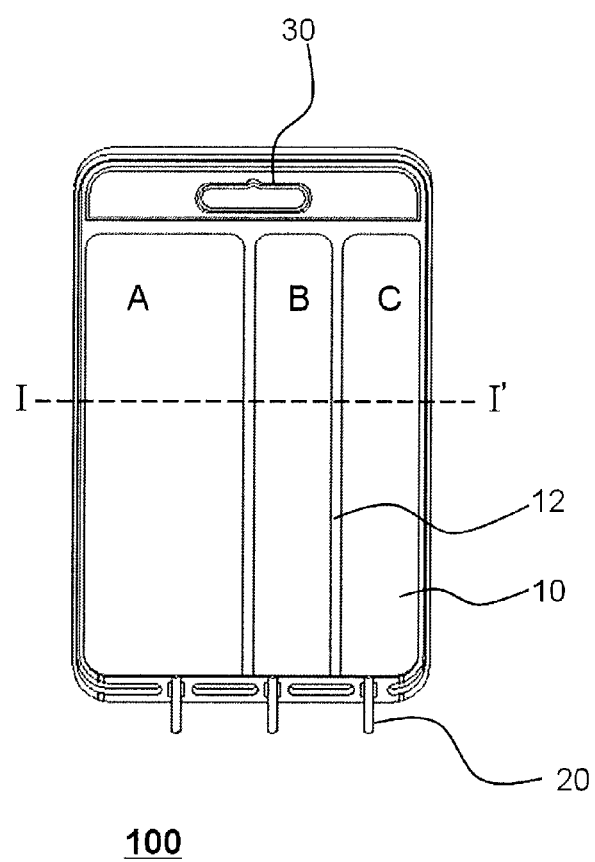
FIG. 2 is a schematic view of the medical solution container in accordance with one embodiment of the present invention.
Figure 3:
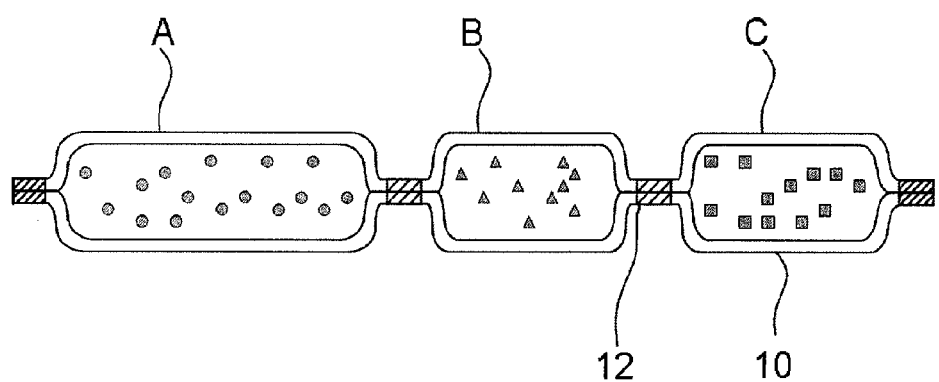
FIG. 3 is a longitudinal-sectional view along line I-I' line of FIG. 2.
Figure 4:
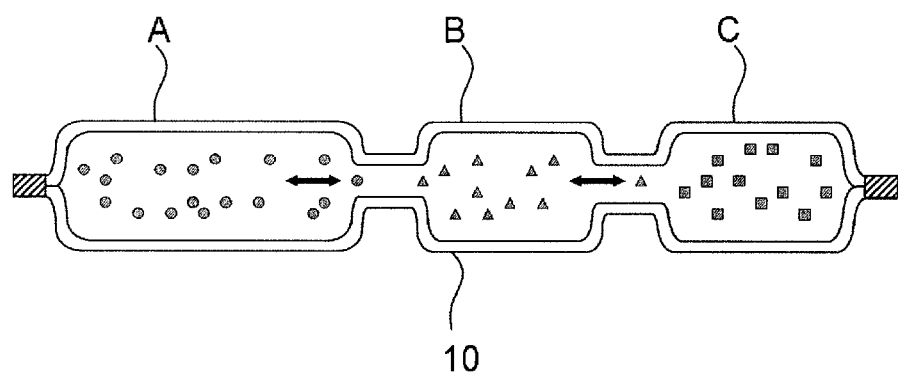
FIG. 4 is a longitudinal-sectional view of the medical solution container in accordance with one embodiment of the present invention.

FIG. 2 is a schematic view of medical solution container in accordance with one embodiment of the present invention, and FIGS. 3 and 4 are a longitudinal-sectional view along line I-I' line of FIG. 2.

Referring to FIG. 2, the medical solution container (100) comprises the inner bag (10) having multiple chambers divided by partition walls (12); an outlet (20) for discharging medical solutions; and a hanger (30) for hanging the container (100).

The inner bag (10) is divided by partition wall (12) and has chambers for containing medical solutions; i.e. three chambers of A, B, and C. The number of chamber varies adequately depending on needs.

The container has the outlet (20) for discharging medical solutions in the chambers (A, B, C) connected to the inner bag (10).

The partition walls (12) are soft-sealed and have easy peelability opening easily by forcing.

In the present invention, the hanger (30) also serves as a means of breaking up the partition walls (12) by rolling the container (100), as the material of the hanger is a hard type. These functions of the hanger (30) as a partition walls crusher and the preferable materials of the hanger (30) are well known and therefore may be understood as prior arts.

Referring to FIG. 4, by pushing the chambers of A, B, and C in the inner bag (10) of the container (100), the sealing of the partition walls are dismantled, and then the chambers of A, B, and C open to each other. Notwithstanding the opening of chambers, the inner bag still keeps sealed by out line of the chambers.

After the opening, components of medical solutions in each chamber (A, B, C) fully mix with each other by shaking the inner bag (10). And then, the mixed mixture is administered to a patient via the outlet (20) using a syringe (set for medical solution, not drawn).

In a preferred embodiment of the present invention, the container for medical solutions has three chambers containing glucose solution, amino acid solution, and fat emulsion. In state of storage, chamber A contains first medical solution (glucose solution), chamber B contains second medical solution (amino acid solution), and chamber C contains third medical solution (fat emulsion) respectively. And in state of use, the three kinds of medical solution are admixed by opening partition walls in chambers of A, B, and C.

The glucose solution comprises glucose monohydrate 114.86~415.80 g, sodium dihydrogen phosphate dihydrate 0~6.55 g, and zinc acetate dihydrate 0~0.02 g regarding solution 1000 ml.

The amino acid solution comprises L-alanin 9.22~17.83 g, L-arginin 5.13~11.87 g, L-aspartic acid 2.85~5.51 g, L-glutamic acid 5.32~12.88 g, glycine 14~8.30 g, L-histidine 0~7.14 g, L-histidine monohydrochloride 0~6.22 g, L-isoleucine 4.45~8.62 g, L-leucine 5.95~11.51 g, L-lysine monohydrochloride 5.40~11.87 g, L-methionine 3.72~7.18 g, L-phenylalanine 6.67~12.90 g, L-proline 6.46~12.50 g, L-serine 4.28~11.03 g, L-threonine 3.46~6.67 g, L-tryptophane 1.08~2.10 g, L-tyrosine 0~0.24 g, L-valine 4.94~9.46 g, calcium chloride dihydrate 0.84~1.64 g, sodium glycerophosphate 0~5.29 g, magnesium sulphate heptahydrate 0~3.45 g, magnesium acetate tetrahydrate 0~2.39 g, potassium chloride 0~6.27 g, potassium acetate 0~9.68 g, sodium acetate trihydrate 0.53~8.58 g, sodium chloride 0~2.27 g, sodium hydroxide 0~3.07 g and acetic acid 0~6.89 g regarding solution 1000 ml.

The fat emulsion comprises soybean oil 95~210 g, MCT (medium chain triglyceride) oil 0~105 g, lecithin 11.4~12.6 g, glycerol 20.9~26.25 g, α-tocopherol 0~0.08 g, sodium hydroxide 0.05~0.10 g, and sodium oleate 0~0.32 g regarding solution 1000 ml.

The partition walls (12) diving each chamber (A, B, C) in the container (100) are made by heat seal method. The partition walls (12) are dismantled by physical pressure, and preferable peel strength is 5~15N/15 mm. If the peel strength is under the range, the partition walls are easily opened and it is difficult to sustain partition walls. Such the peel strength may be modulated by designing the container (100).

Mode for Invention

Herein below, preferable examples and test examples are disclosed. But the present invention is not restricted within the preferable examples and test examples.

EXAMPLES 1~3 AND COMPARATIVE EXAMPLES 1~3

Multilayer films were prepared by co-extrusion method based on the composition of the following Table 1. All fabrication procedure was executed in a clean room for clearness. And the multilayer film was fabricated by water-cooling in the co-extrusion downward type inflation film machine. The raw materials of composition were melted in the co-extruder, and the multilayer film was fabricated by passing roller on the circular tube type film blew through a die. The thickness of outer layer/intermediate layer/inner layer of fabricated multilayer film was respectively 20 μm/160 μm/20 μm.

TABLE 1

| Composition | | Exp. 1 | Exp. 2 | Exp. 3 | Com. Exp. 1 | Com. Exp. 2 | Com. Exp. 3 |
|---|---|---|---|---|---|---|---|
| outer layer | HOMO PP[1)] | 100 wt % | 100 wt % | 100 wt % | 100 wt % | 100 wt % | 100 wt % |
| intermediate layer | PP[2)] | 50 wt % | 50 wt % | 50 wt % | 50 wt % | 50 wt % | 50 wt % |
| | SEBS[3)] | 50 wt % | 50 wt % | 50 wt % | 50 wt % | 50 wt % | 50 wt % |
| inner layer | PP[4)] | 60 wt % | 65 wt % | 70 wt % | 85 wt % | 80 wt % | 90 wt % |
| | SEBS[5)] | 25 wt % | 20 wt % | 15 wt % | — | 10 wt % | 10 wt % |
| | PE[6)] | 15 wt % | 15 wt % | 15 wt % | 15 wt % | 10 wt % | — |

HOMO PP: melt flow index of 8 g/10 min, density of 0.90, softening point of 150° C., product of Honam Petrochemical Corp.
Propylene-ethylene-butylene terpolymer: melt flow index of 7 g/10 min., density of 0.90, melting point of 125° C., softening point of 125° C., product of SK chemicals Co., Ltd.
SEBS: specific gravity 0.90, melt flow index of 2 g/10 min., 100% modulus of 0.6 Mpa, product of KRATON.
Ethylene-propylene random copolymer: melt flow index of 7 g/10 min., density of 0.90, melting point of 130° C., softening point of 115° C., product of SAMSUNG Petrochemical Co., Ltd.
SEBS: specific gravity of 0.95, melt flow index of 10 g/10 min., 100% modulus of 1.1 Mpa, product of Korea Keumho Petrochemical Co., Ltd.
PE: melt flow index of 0.3 g/10 min., density of 0.95, melting point of 135° C., softening point of 125° C., product of Korea Petrochemical Ind, Co., Ltd.

TEST EXAMPLE 1

The test result of peel strength (soft seal) of the multilayer films fabricated in the Examples and Comparative Examples was shown in Table 2.

After heat-adhering the multilayer film twofold and cutting the folded multilayer film by size of 15 mm×150 mm, the cut multilayer film was peeled vertically by Universal Testing Machine 2810 (TIRA, Germany). The maximum peel strength was called 'peel strength'. The peeling speed was 200 mm/min, TEST MACHINE was Universal Testing Machine 2810 (TIRA, Germany).

TABLE 2

| Property | | Exp. 1 | Exp. 2 | Exp. 3 | Com. Exp. 1 | Com. Exp. 2 | Com. Exp. 3 |
|---|---|---|---|---|---|---|---|
| Thickness, μm | | 200 μm | 200 μm | 200 μm | 200 μm | 200 μm | 200 μm |
| Peeling property after sterilization | | good | good | good | poor | normal | poor |
| Peel strength, N | 140° C. | — | — | — | — | 0.50 | 0.24 |
| | 145° C. | 0.71 | 0.79 | 0.56 | 0.26 | 1.17 | 0.29 |
| | 150° C. | 2.38 | 1.37 | 2.76 | 0.32 | 2.43 | 2.38 |
| | 155° C. | 4.08 | 1.84 | 4.26 | 4.88 | 5.10 | 2.51 |
| | 160° C. | 5.54 | 3.29 | 9.00 | 26.44 | 12.23 | 18.50 |

The multilayer films of Examples 1~3 showed good peeling property after sterilization, while the films of Comparative Examples 1 to 3 were torn partially and thus showed poor property As the results, the peel strength of all multilayer films tends slightly to increase according to sealing temperature increase. The peel strength of the multilayer film of Example 2 increased mildly from 0.79N to 3.29N, compared with that of Comparative Example 1 increasing significantly from 0.26N to 26.44N.

In other words, the multilayer films of Examples 1 to 3 showed good easy peelability with non temperature sensitive that can be used as an easy-peel film being easy to process and control the temperature. In comparison with this, the multilayer film of Comparative Examples 1 to 3 showed bad easy peelability owing to wide change width of peeling strength according to sealing temperature change, therefore it is unsuitable for easy peelable film.

EXAMPLE 4

Fabrication of Container for Medical Solutions

Pouch type of medical solution container was fabricated by heat-sealing of two films using heat-sealing equipment. Film rolled around the roller was released to fabricate a bag, and the bag was printed using Hot Stamping Foil. After printing, soft seal partition wall was fabricated using partition wall sealing mold. One side among four sides of bag was left for space for tube injection using outer sealing mold, the left sides of the bag was hard-sealed. And the bag was fabricated by opening the unsealed part for tube injection, and injecting tube, and heat adhering using tube sealing mold. At this moment, the multilayer film fabricated in example 1 was used as an inner bag material and polypropylene film was used as an outer bag material.

FABRICATION EXAMPLE 1

An each solution of glucose, amino acid and fat emulsion was prepared by the following Tables 3 to 5. Each solution was filtered using a medical filter, was injected into each three chambers, and the bag was sealed to fabricate a medical solution container.

TABLE 3

| Glucose solution (g) | Fab. Exp. 1 | Fab. Exp. 2 | Fab. Exp. 3 | Fab. Exp. 4 |
|---|---|---|---|---|
| Glucose monohydrate | 114.86 | 219.56 | 167.20 | 415.80 |
| sodium dihydrogen phosphate dihydrate | — | — | 2.22 | 6.55 |
| zinc acetate dihydrate | — | — | 0.01 | 0.02 |

TABLE 4

| Amino acid solution (g) | Fab. Exp. 1 | Fab. Exp. 2 | Fab. Exp. 3 | Fab. Exp. 4 |
|---|---|---|---|---|
| L-alanin | 15.20 | 16.80 | 9.22 | 17.83 |
| L-arginin | 10.74 | 11.87 | 5.13 | 9.92 |
| L-aspartic acid | 3.23 | 3.57 | 2.85 | 5.51 |
| L-glutamic acid | 5.32 | 5.88 | 6.65 | 12.88 |
| glycine | 7.51 | 8.30 | 3.14 | 6.07 |
| L-histidine | 6.46 | 7.14 | — | — |
| L-histidine monohydrochloride | — | — | 3.21 | 6.22 |
| L-isoleucine | 5.32 | 5.88 | 4.45 | 8.62 |
| L-leucine | 7.51 | 8.30 | 5.995 | 11.51 |
| L-lysine monohydrochloride | 10.74 | 11.87 | 5.40 | 10.45 |
| L-methionine | 5.32 | 5.88 | 3.72 | 7.18 |
| L-phenylalanine | 7.51 | 8.30 | 6.67 | 12.90 |
| L-proline | 6.46 | 7.14 | 6.46 | 12.50 |
| L-serine | 4.28 | 4.73 | 5.70 | 11.03 |
| L-threonine | 5.32 | 5.88 | 3.46 | 6.67 |
| L-tryptophane | 1.81 | 2.00 | 1.08 | 2.10 |
| L-tyrosine | 0.22 | 0.24 | — | — |
| L-valine | 6.94 | 7.67 | 4.94 | 9.46 |
| calcium chloride dihydrate | 0.86 | 0.95 | 0.84 | 1.64 |
| sodium glycerophosphate | 4.79 | 5.29 | — | — |
| magnesium sulphate heptahydrate | 3.13 | 3.45 | — | — |
| magnesium acetate tetrahydrate | — | — | 1.22 | 2.39 |
| potassium chloride | 5.67 | 6.27 | — | — |
| potassium acetate | — | — | 5.59 | 9.68 |
| sodium acetate trihydrate | 7.76 | 8.58 | 0.53 | 1.14 |
| sodium chloride | — | — | 0.90 | 2.27 |
| sodium hydroxide | — | — | 1.52 | 3.07 |
| acetic acid | 3.24 | 6.89 | — | — |

TABLE 5

| Fat emulsion (g) | Fab. Exp. 1 | Fab. Exp. 2 | Fab. Exp. 3 | Fab. Exp. 4 |
|---|---|---|---|---|
| Soybean oil | 190.0 | 210.00 | 95.00 | 105.00 |
| MCT (medium chain triglyceride) oil | — | — | 95.00 | 105.00 |
| lecithin | 11.40 | 12.60 | 11.40 | 12.60 |
| glycerol | 20.90 | 23.10 | 23.75 | 26.25 |
| α-tocopherol | — | — | 0.08 | 0.08 |
| sodium hydroxide | 0.05 | 0.05 | 0.09 | 0.10 |
| sodium oleate | — | — | 0.29 | 0.32 |

INDUSTRIAL APPLICABILITY

The multilayer film of the present invention is usable as an inner bag for containing medical solutions.

What is claimed is:

1. A multilayer film for a medical solution container comprising,
   an outer layer comprising polypropylene, polypropylene copolymer or a mixture thereof;
   an intermediate layer consisting essentially of a mixture of 30~70% by weight of propylene-based polymer including polypropylene, polypropylene copolymer or a mixture thereof, and 30~70% by weight of a styrene-based thermoplastic elastomer; and
   an inner layer comprising a mixture of 50~70% by weight of propylene-based polymer including polypropylene, polypropylene copolymer or a mixture thereof, 5~20% by weight of polyethylene, and 10~45% by weight of a styrene-based thermoplastic elastomer.

2. The multilayer film according to claim 1,
   wherein the polypropylene copolymer is a copolymer of propylene and a co-monomer selected from the group consisting of ethylene, α-olefin and a mixture thereof.

3. The multilayer film according to claim 2,
   wherein the α-olefin is selected from the group consisting of 1-butene, 1-pentene, 1-hexene, 4-methyl-1-pentene, 1-heptene, 1-octene, 1-nonene, 1-decene, 1-undecene, 1-dodecene and a mixture thereof.

4. The multilayer film according to claim 1,
   wherein the styrene-based thermoplastic elastomer is selected from the group consisting of SBS (styrene-butylene-styrene copolymer), SEBS (styrene-ethylene-butylene-styrene copolymer), SIS (styrene-isoprene-styrene copolymer), SBC (styrene-butadiene block copolymer) and a mixture thereof.

5. The multilayer film according to claim 1,
   wherein the thickness ratio of each layer is outer layer:intermediate layer:inner layer=10~20:60~80:10~20.

6. The multilayer film according to claim 1,
   wherein the melting point of outer layer, intermediate layer and inner layer ranges 140~165° C., 130~145° C., and 130~145° C., respectively.

7. The multilayer film according to claim 1,
   wherein the multilayer film is used as an inner bag of double bag type medial solution container.

8. A medical solution container employing an inner bag with multiple chambers containing medical solutions; and an outer bag covering the inner bag,
   wherein the inner bag comprises the multilayer film for medical solution of claim 1.

9. The medical solution container according to claim 8,
   wherein the container have three chambers and each chamber contains glucose solution, amino acid solution, and fat emulsion, respectively.

10. The medical solution container according to claim 9,
    wherein the glucose solution comprises glucose monohydrate 114.86~415.80 g, sodium dihydrogen phosphate dihydrate 0~6.55 g, and zinc acetate dihydrate 0~0.02 g regarding solution 1000 ml.

11. The medical solution container according to claim 9,
    wherein the amino acid solution comprises L-alanin 9.22~17.83 g, L-arginin 5.13~11.87 g, L-aspartic acid 2.85~5.51 g, L-glutamic acid 5.32~12.88 g, glycine 0.14~8.30 g, L-histidine 0~7.14 g, L-histidine monohydrochloride 0~6.22 g, L-isoleucine 4.45~8.62 g, L-leucine 5.95~11.51 g, L-lysine monohydrochloride 5.40~11.87 g, L-methionine 3.72~7.18 g, L-phenylalanine 6.67~12.90 g, L-proline 6.46~12.50 g, L-serine 4.28~11.03 g, L-threonine 3.46~6.67 g, L-tryptophane 1.08~2.10 g, L-tyrosine 0~0.24 g, L-valine 4.94~9.46 g, calcium chloride dihydrate 0.84~1.64 g, sodium glycerophosphate 0~5.29 g, magnesium sulphate heptahydrate 0~3.45 g, magnesium acetate tetrahydrate 0~2.39 g, potassium chloride 0~6.27 g, potassium acetate 0~9.68 g, sodium acetate trihydrate 0.53~8.58 g, sodium chloride 0~2.27 g, sodium hydroxide 0~3.07 g and acetic acid 0~6.89 g regarding solution 1000 ml.

12. The medical solution container according to claim 9,
    wherein the fat emulsion comprises soybean oil 95~210 g, MCT (medium chain triglyceride) oil 0~105 g, lecithin 11.4~12.6 g, glycerol 20.9~26.25 g, α-tocopherol 0~0.08 g, sodium hydroxide 0.05~0.10 g, and sodium oleate 0~0.32 g regarding solution 1000 ml.

13. A medical solution container employing an inner bag with multiple chambers containing medical solutions; an outer bag covering the inner bag; partition walls dividing multiple chambers; outlets for discharging medical solutions; and a hanger for hanging the container,
   wherein the inner bag comprises the multilayer film of claim 1 and the hanger is a means of breaking up the partition walls.

* * * * *